United States Patent Office 2,952,697
Patented Sept. 13, 1960

2,952,697

CYCLOPENTADIENYL METAL COMPOUNDS

Richard D. Gorsich, Baton Rouge, La., assignor to Ethyl Corporation, New York, N.Y., a corporation of Delaware No Drawing. Filed Oct. 7, 1958, Ser. No. 765,741

3 Claims. (Cl. 260—429)

This invention relates to cyclopentadienyl metal compounds and, more particularly, to a process for the production of cyclopentadienyl metal halide compounds of metals of group IV–B and vanadium.

It is an object of this invention to provide a novel process for producing cyclopentadienyl metal compounds. Another object is to provide a process for compounds which are highly useful as catalyst for polymerization of olefins, particularly when used concurrently with reducing agents, such as organometallic compounds. Another object is to provide an economical process which is adapted for large scale commercial production and which is highly selective in the formation of these compounds. Other objects and advantages of this invention will become more apparent in the following description and appended claims.

These and other objects of the invention are accomplished by producing cyclopentadienyl dihalo metal alcoholates of metals of group IV–B of the periodic table and vanadium by the reaction of a cyclopentadienyl metal trihalide with an alcohol. (The group IV–B metals are in accordance with the table shown in the Handbook of Chemistry and Physics, 36th Edition, Chemical Rubber Publishing Company, pages 392–393.)

More specifically, the process of this invention comprises reacting an alcohol, monohydric or polyhydric, with a compound having the general formula $$CpMX_3$$

to form a compound having the general formula $$CpMX_2A$$

wherein Cp is a cyclopentadienyl group, including substituted cyclopentadienyl groups, M is a metal as defined above, X is a halogen and A is the corresponding alcohol residue. Thus, with polyhydric alcohols, the compounds made by the process of this invention, can have two or more cyclopentadienyl metal dihalogen groups bonded to the same alcohol residue. Moreover, the alcohol residue can contain other functional groups, such as halogens and nitro groups and can have ether linkages, as with the polyalkylene glycols.

More particularly, the process of this invention involves the reaction of a cyclopentadienyl metal trihalide of the metals defined above with an alcohol at a temperature of from −50° to 300° C., preferably from a temperature of about 0° to 200° C. The reaction can be conducted either in the absence or presence of an inert diluent or solvent. Generally, with the less active alcohols, the reaction is conducted in the absence of a diluent, the alcohol itself acting as a solvent for the cyclopentadienyl metal trihalide. With the more active alcohols, it is sometimes desired to use an inert diluent or solvent in order to reduce the concentration of the alcohol and thus avoid any tendency of the alcohol to cleave the cyclopentadienyl radical. Likewise, with the more active alcohols, it is preferred to avoid prolonged heating of the cyclopentadienyl metal compound in the presence of the alcohol to avoid such cleavage reaction.

Typical examples of compounds which are made by the process of this invention are cyclopentadienyl methoxy titanium dichloride, cyclopentadienyl methoxy titanium dibromide, cyclopentadienyl methoxy titanium difluoride, cyclopentadienyl ethoxy titanium dichloride, cyclopentadienyl tertiary butoxy titanium dichloride and similar alkoxy compounds having from one to about 20 carbon atoms in the alkyl group. Typical aryloxy cyclopentadienyl dihalo titanium compounds are cyclopentadienyl phenoxy titanium dichloride, cyclopentadienyl methylphenoxy titanium dichloride, cyclopentadienyl ethylphenoxy titanium dibromide, cyclopentadienyl chlorophenoxy titanium dichloride, cyclopentadienyl cyclohexyloxy titanium dichloride, cyclopentadienyl nitrophenoxy titanium dichloride, the cyclopentadienyl dichloro titanium alcoholate of ethylene glycol $$(CpTiCl_2OCH_2CH_2OCl_2TiCp)$$

the methylcyclopentadienyl dibromo titanium alcoholate of propylene glycol, the indenyl dichloro titanium alcoholate of 2,2-dimethyl-1,3-propanediol, the cyclopentadienyl dichloro titanium alcoholate of 1,3,5-pentanetriol and the corresponding alcoholates of 1,10-decanediol, 1,18-octadecanediol, the resorcinals, the catechols, and the like. The cyclopentadienyl group can contain from 5 to 20 carbon atoms but the most preferred compounds for most uses contain from 5–15 carbon atoms.

In addition to the above, ether alcohols can be condensed with cyclopentadienyl titanium trihalides to form the corresponding alcoholates. Thus, the compounds of this invention include the alcoholates formed from ether alcohols such as 2-ethoxyethanol, 2-benzyloxyethanol, 2-butoxyethanol and the like. Likewise the alcoholates of this invention include those of the glycol ethers and polyglycol ethers, such as the alcoholates formed by reaction of cyclopentadienyl titanium trichloride with dimethylene glycol, diethylene glycol, triethylene glycol, tetraethylene glycol, dipropylene glycol, tributylene glycol, and other similar glycol ethers having the formula $$HO-(C_nH_{2n}-O-C_mH_{2m})_x-OH$$

wherein $n$, $m$, and $x$ are integers of from 1–5 inclusive. The alcohols useful for this invention can have from 1 to about 30 carbon atoms, preferably 1 to 20 carbon atoms.

The present process can be utilized to make corresponding compounds of zirconium, hafnium and vanadium. Typical examples of these compounds are cyclopentadienyl methoxy zirconium dichloride, cyclopentadienyl ethoxy zirconium dibromide, methyl cyclopentadienyl phenoxy zirconium difluoride, cyclopentadienyl butoxy hafnium dichloride, indenyl benzyloxy hafnium difluoride, cyclopentadienyl methoxy vanadium dichloride, fluorenyl propoxy vanadium dichloride, ethylcyclopentadienyl tetradecyloxy vanadium dichloride, and the like. Likewise, the present invention covers the cyclopentadienyl zirconium, hafnium and vanadium dihalo alcoholates of monohydric and polyhydric alcohols corresponding to those discussed above.

The diluents or solvents suitable for use in the process of this invention are hydrocarbons, preferably aromatic hydrocarbons, ethers, including polyethers, chlorinated hydrocarbons and any other inert media which is non-reactive to the reactants or products. Typical examples of suitable solvents are hexane, decane, octadecane, petroleum fractions, benzene, toluene, xylenes, naphthalenes, alkyl naphthalenes, cyclohexane, 1,1-dichloroethane, 1,2-dichloroethane, trichloroethylene, tetrachloroethylene, carbon tetrachloride, trichlorobenzene, chlorinated biphenyls, dibutyl ether, dihexyl ether, the ethylene and higher alkylene glycol ethers, the diethylene glycol dialkyl ethers, such as diethylene glycol dimethyl ether, diethylene glycol diethyl ether, diethylene glycol dibutyl ether, diethylene glycol methylethyl ether and the like. The higher glycol alkyl ethers are also suitable such as the triethylene glycol or tetraethylene glycol dialkyl ethers.

The cyclopentadienyl metal trihalides can be reacted with the alcohols in from about 0.5 to 100 mole equivalents, based on the metal halide to alcohol ratio. Preferably, the alcohol is used in at least stoichiometric quantities and usually for monoalcoholates it is employed in excess of at least 100%. The highest ratios are generally used when the alcohol is being employed concurrently as a solvent. With the more active alcohols, a solvent is usually employed and the quantities used are closer to equivalent amounts.

The cyclopentadienyl metal trihalides employed in this invention can be made by reacting dicyclopentadienyl metal dihalides with metal halides, e.g., bis(cyclopentadienyl) titanium dichloride is reacted with titanium tetrachloride to form cyclopentadienyl titanium trichloride. These compounds can also be made by direct halogenation of the bis(cyclopentadienyl) metal dihalides. The bis(cyclopentadienyl) metal dihalides can be prepared in accordance with the procedure disclosed in British Patent No. 797,151 or in J. Am. Chem. Soc., vol. 76, 4281 (1954).

The following examples illustrate the process of this invention.

EXAMPLE I

*Cyclopentadienyl methoxy titanium dichloride*

Two parts of cyclopentadienyl titanium trichloride were dissolved in 15.9 parts of refluxing methanol. Excess solvent was distilled off under reduced pressure (water aspirator at 50° C.). The yellow residue was dissolved in a medium of ethyl acetate and n-pentane was added until the solution became cloudy. The solution was then chilled by Dry Ice and the yellow crystals of cyclopentadienyl methoxy titanium dichloride were rapidly filtered off, dried at room temperature at 0.05 millimeter for 2.5 hours, and stored under a nitrogen atmosphere. The melting point of the product was 89°–90° C.

The cyclopentadienyl methoxy titanium dichloride prepared as above is used in equivalent quantities with triethyl aluminum as a catalyst for polymerization of ethylene. The polymerization can be conducted at 100° C., in heptane solvent using 1000 p.s.i.g. ethylene pressure to give a solid, white polymeric product. The alcoholate of this invention gives faster, more uniform polymerization rates and has longer catalytic life than when employing other titanium-containing compounds. Similar results are obtained with other olefins, such as propylene.

EXAMPLE II

*Cyclopentadienyl dichloro titanium alcoholate of 2,2-dimethyl 1,3-propanediol*

A solution of 1.7 parts of cyclopentadienyl titanium trichloride and about 25 parts of benzene were heated to reflux. Subsequently, 0.41 part of 2,2-dimethyl 1,3-propanediol was added to the solution and the reaction mixture was again heated to reflux. Petroleum ether (30°–60° C.) was added until the solution became cloudy, whereupon the solution was allowed to slowly cool to room temperature and the yellow crystals were filtered off to give 1.4 parts of the cyclopentadienyl dichloro titanium alcoholate of 2,2-dimethyl 1,3-propanediol, melting point 153°–156° C.

EXAMPLE III

*Cyclopentadienyl tertiary butoxy titanium dichloride*

Two parts of cyclopentadienyl titanium trichloride were dissolved in 20 parts of hot tertiary butyl alcohol. This mixture was then refluxed. Petroleum ether (boiling point 30°–60° C.) was added to the yellow solution which was then chilled by Dry Ice. Yellow needles were filtered off which analyzed for cyclopentadienyl tertiary butoxy titanium dichloride.

EXAMPLE IV

*Methyl cyclopentadienyl hexadecyloxy zirconium dibromide*

Cyclopentadienyl zirconium tribromide is reacted at 180° C. with a mole equivalent of hexadecyl alcohol in diethylene glycol dimethyl ether solvent. The product is produced in good yield and is recovered by crystallization.

EXAMPLE V

*Indenyl phenoxy halfnium difluoride*

Indenyl hafnium trifluoride is reacted with 1.2 mole equivalents of phenol in 6 moles of n-hexane solvent. The reaction is conducted at 0° C. The product is recovered by chilling the reaction solution with Dry Ice and thereafter filtering the crystalline product.

EXAMPLE VI

*Ethylcyclopentadienyl cyclohexyloxy vanadium dichloride*

Example I is repeated except that ethylcyclopentadienyl vanadium trichloride is reacted with cyclohexanol. Such example of cyclohexanol is employed in excess, the excess cyclohexanol serving as a diluent for the reaction. The temperature of the reaction is maintained at about 120° C. An excellent product yield is obtained.

EXAMPLE VII

*Fluorenyl zirconium dichloride alcoholates of ethylene glycol*

Fluorenyl zirconium trichloride is reacted with 0.5 mole equivalent of ethylene glycol at 90° C. to form predominately the dialcoholate. The crystalline material is recovered in accordance with the procedure of Example I in excellent yield. When the procedure is repeated using excess quantities of ethylene glycol, i.e., 2 mole equivalents of ethylene glycol, the product is principally the monoalcoholate.

EXAMPLES VIII–XIII

Example I is repeated except that different reactants, alcohols and solvent are employed. The details of these examples is given in the following table:

*Table*

| Example | CpMX$_3$ | Alcohol | Solvent | Temp. |
|---------|----------|---------|---------|-------|
| VIII | Acetylcyclopentadienyl titanium tribromide | 1,3,5-pentane triol | Dibutyl ether | 80° C. |
| IX | Vinyl cyclopentadienyl vanadium tribromide | m-Resorcinal | Tetrahydrofuran | 20° C. |
| X | Benzyl cyclopentadienyl titanium tribromide | Chlorophenol | Carbon tetrachloride | 10° C. |
| XI | Phenyl cyclopentadienyl zirconium trichloride | Nitrophenol | Toluene | 10° C. |
| XII | Cyclopentadienyl titanium tribromide | Methoxyethanol | None | Reflux. |
| XIII | Cyclopentadienyl titanium triiodide | Dipropylene glycol | do | 150° 3. |

In the above examples, when mole equivalents of the polyhydric alcohols are employed the products are primarily the polyalcoholates and when excess quantities of the alcohol are employed, the product is principally the monoalcoholate.

The above examples illustrate the process of this invention conducted with a variety of monohydric and polyhydric alcohols. When the above examples are repeated using n-hexane, decanol, eicosanol, cresol, naphthol, t-butyl alcohol, benzyl alcohol, alkyl and dialkyl phenols such as dimethyl phenol, butylene glycol, glycerol and the like, comparable results are obtained. In general, each of the alcohols, straight chain, branched, cyclic or aromatic, containing 1–20 carbon atoms, preferably 1–10, and 1–3 hydroxyl groups can be reacted with any one or a mixture of the cyclopentadienyl metal trihalides used in the above examples or those mentioned elsewhere above. Moreover, in some cases two or more alcohols can be reacted with any of the above cyclopentadienyl metal halides above disclosed. The preferred alcohols are hydrocarbons, i.e. contain only carbon atoms and hydrogen atoms, in addition to the hydroxyl group or groups. However, the alcohols can be substituted with substituents such as halogens which are inert in the reaction. The cyclopentadienyl groups used in this invention are likewise preferably hydrocarbons but these groups can also contain other groups which are inert in the reaction. Best results are obtained with cyclopentadienyl groups containing from 5 to about 17 carbon atoms.

I claim:

1. A process for the production of cyclopentadienyl dihalo metal alcoholates comprising reacting at a temperature between about −50° C. and 300° C., a cyclopentadienyl hydrocarbon metal trihalide in which the cyclopentadienyl hydrocarbon group contains from 5 to about 20 carbon atoms with a hydrocarbon alcohol having from 1 to 20 carbon atoms and 1 to 3 hydroxyl groups, said metal being selected from the group consisting of metals of group IV–B and vanadium, the cyclopentadienyl hydrocarbon metal trihalide to alcohol mole equivalent ratio being from about 0.5 to about 100.

2. The process of claim 1 wherein the reaction is conducted at a temperature of 0 to 200° C. and the quantity of alcohol is at least stoichiometric relative to the quantity of the cyclopentadienyl hydrocarbon trihalide.

3. The process of claim 1 wherein the reaction is carried out in the presence of a solvent.

References Cited in the file of this patent

FOREIGN PATENTS 793,354    Great Britain _____ Apr. 16, 1958